United States Patent

Bargenquast et al.

[11] Patent Number: 5,813,697
[45] Date of Patent: Sep. 29, 1998

[54] FORKLIFT STABILIZING APPARATUS

[75] Inventors: J. Scott Bargenquast, Saukville; Terry A. Weber, Greenfield; John R. Plate, Milwaukee, all of Wis.

[73] Assignee: Trak International, Inc., Port Washington, Wis.

[21] Appl. No.: 804,291

[22] Filed: Mar. 3, 1997

Related U.S. Application Data

[63] Continuation of Ser. No. 350,216, Dec. 5, 1994, Pat. No. 5,639,119.

[51] Int. Cl.$^6$ ..................................................... B60R 27/00
[52] U.S. Cl. ........................... 280/754; 280/6.1; 280/6.12; 280/755; 280/840; 280/DIG. 1
[58] Field of Search ..................................... 280/754, 755, 280/DIG. 1, 840, 6.1, 6.11, 6.12; 212/277, 301

[56] References Cited

U.S. PATENT DOCUMENTS

| | | |
|---|---|---|
| 1,371,648 | 3/1921 | Schmidt . |
| 3,976,302 | 8/1976 | Hammarstrand ........................ 280/6.12 |
| 4,152,000 | 5/1979 | Meisel, Jr. . |
| 4,264,014 | 4/1981 | Hogg et al. . |
| 4,393,959 | 7/1983 | Acker . |
| 4,705,295 | 11/1987 | Fought . |
| 4,975,849 | 12/1990 | Ema . |

FOREIGN PATENT DOCUMENTS

| | | |
|---|---|---|
| 26 54 425 | 6/1978 | Germany . |
| 58-183307 | 10/1983 | Japan . |
| 629092 | 10/1978 | U.S.S.R. . |

*Primary Examiner*—Eric D. Culbreth
*Attorney, Agent, or Firm*—Dickstein Shapiro Morin & Oshinsky LLP

[57] ABSTRACT

Disclosed herein is a vehicle including a frame, and a stabilizer apparatus including a pressure source, first and second fluid-actuated stabilizer assemblies connected respectively to the front and rear axles shiftably moveable on the frame, one of the first and second stabilizer assemblies normally being locked against extension and contraction in the absence of pressurization thereof by the pressure source, and the other of the first and second stabilizer assemblies normally being free to extend and contract in the absence of pressurization thereof by the pressure source, hydraulic circuit connected between the pressure source and the first and second fluid activated stabilizer assemblies and including flow controller operable between a first mode wherein the pressure source is disconnected from the first and second stabilizer assemblies, whereby the one of the stabilizer assemblies is locked against extension and retraction, thereby locking the axle connected thereto against shifting movement relative to the frame, and whereby the other of the stabilizer assemblies is free to extend and retract, thereby permitting shifting movement relative to the frame of the axle connected thereto, and a second mode wherein the pressure source is selectively connectable to the first and second stabilizer assemblies for selective pressurization thereof by the pressure source so as to selectively extend and retract the first and second stabilizer assemblies.

17 Claims, 6 Drawing Sheets

FORKLIFT STABILIZING APPARATUS

This application is a continuation of application Ser. No. 08/350,216, filed Dec. 5, 1994, now U.S. Pat. No. 5,639,119.

BACKGROUND OF THE INVENTION

1. Field of the Invention

The invention relates to forklifts including rough terrain forklifts or other load moving vehicles, and, more particularly, to a stabilizing apparatus for the forklift frame.

2. Reference to Prior Art

Rough terrain forklifts are commonly used in a variety of industries for moving and lifting heavy or bulky loads. These vehicles are used at construction sites and may be used on relatively rough terrain or uneven surfaces, and generally include a boom or crane mechanism for raising and lowering a set of forks.

Rough terrain forklifts include front and rear axle assemblies each generally mounted on the forklift main frame so that the axle assemblies can shift with respect to the frame. These forklifts also often include at least one hydraulic leveling cylinder assembly between the frame and the front axle assembly for leveling the frame. The leveling cylinder assembly is manually operable to tilt the frame to the right or to the left so that the frame and load supporting boom can be leveled when the forklift is on uneven ground.

SUMMARY

This invention provides a stabilizer apparatus for a rough terrain forklift or other vehicle to restrict tipping of the vehicle main frame as the vehicle is driven over uneven surfaces.

An object of the invention is the provision of a stabilizer apparatus for use on a forklift having a main frame and an axle assembly supporting the main frame, the axle assembly being shiftable with respect to the main frame, the stabilizer apparatus having particular utility for mechanically restricting or preventing shifting movement of the axle assembly with respect to the main frame, thereby substantially reducing or preventing rocking or tilting of the frame when the forklift moves over an obstruction.

Another object of the invention is the provision of means for mounting the stabilizer apparatus on a forklift or other vehicle including a main frame and an axle assembly so that at least a portion of the load transmitted from the axle assembly to the stabilizer apparatus is transferred mechanically directly to the main frame.

The stabilizer apparatus includes a pair of fluid-actuated stabilizing cylinder assemblies mounted on opposite sides of the forklift main frame. Each stabilizing cylinder assembly includes a cylinder and a reciprocable ram at least partially disposed in the cylinder. Each of the rams includes a rounded end, the rounded end of one of the rams engaging one end of a forklift axle assembly and the rounded end of the other of the rams engaging the other end of the forklift axle assembly.

Each of the stabilizing cylinder assemblies is mounted on the main frame by means for fixedly connecting the cylinder assembly to the main frame, and a shoe. The shoe includes a body portion fixed to the stabilizing cylinder assembly and a flange portion extending under part of the main frame and engaging the main frame for mechanically transferring at least part of the upwardly directed forces on the stabilizing cylinder assembly directly to the main frame.

A fluid pump and fluid reservoir provide pressurized fluid to the stabilizing cylinder assemblies. A pair of check valves, one between the pump and each of the stabilizing cylinder assemblies, permit fluid flow to each of the stabilizing cylinder assemblies but prevent flow in the reverse direction. A pair of restriction orifices and a pair of flow control valves, one restriction orifice and one flow control valve being located between the pump and each of the stabilizing cylinder assemblies, control fluid flow from the stabilizing cylinder assemblies. Each of the flow control valves is shiftable between a first position wherein fluid flow is blocked and a second position wherein fluid flow is permitted. In the second position, fluid flow from the stabilizing cylinder assemblies through the flow control valves is permitted, but is also restricted by the restriction orifices so that the rams engaging the axle assembly are allowed to retract only very slowly in response to upward pressure exerted on the rams from the axle assembly, and so that only very slow movement of the axle assembly relative to the main frame is permitted. When the flow control valves are in the first position, fluid flow from the stabilizing cylinder assemblies is prevented so that retraction of the rams in response to upward pressure on the rams from the axle assembly is prevented, causing the axle assembly to become rigid with respect to the main frame.

The invention also comprises a vehicle including a frame, an axle assembly mounted on the frame and including a front axle means and a rear axle means, each of the axle means being supported at its opposite ends by a wheel and being shiftable relative to the frame, a stabilizer apparatus including first and second fluid-actuated stabilizer assemblies connected, respectively, to the front and rear axle means, a pressure source, hydraulic circuit means connected between the pressure source and the first and second fluid-actuated stabilizer assemblies and including flow control means having a first mode wherein one of the stabilizer assemblies is reciprocated and the other of the stabilizer assemblies is selectively operable whereby one of the axle means is shifted and the other is selectively shiftable. The flow control means also has a second mode wherein both of the stabilizer assemblies are selectively operable.

The invention also includes a method of stabilizing a vehicle having boom means pivotally mounted on the frame for movement through preselected vertical angles, an axle assembly mounted on the frame and including a front axle means and a rear axle means, each of the axle means being supported at its opposite ends by wheels and being shiftable relative to the frame, the method comprising the steps of permitting one of the axle means to shift relative to the frame and selectively shifting the other axle means relative to the frame or locking the axle means relative to the frame when the boom means is below a predetermined vertical angle, and selectively shifting both of the axle means relative to the frame when the boom means is above the predetermined vertical angle, the selective shifting of the front and rear axle means being at a substantially slower speed when the boom means is above said predetermined angle than when said boom is below said predetermined angle.

The invention also comprises a vehicle including a frame, a boom mounted on the vehicle, means for elevating the boom above a predetermined horizontal angle, an axle assembly mounted on the frame and including a front axle means and a rear axle means, each of the axle means being supported at its opposite ends by a wheel and being shiftable relative to the frame, a stabilizer apparatus including first and second fluid-actuated stabilizer assemblies connected respectively to the front and rear axle means, a pressure source, hydraulic circuit means connected between the pressure source and the first and second fluid activated stabilizer assemblies and including flow control means having a first mode wherein one of the stabilizer assemblies is reciprocable and the other of the stabilizer assemblies is selectively operable whereby one of the axle means is shiftable and the other is selectively shiftable, the flow control means having a second mode wherein the one stabilizer assembly is reciprocable at a slower rate than when the hydraulic circuit means is in its first mode, the flow control means including sensing means for sensing when the boom is elevated above the predetermined angle and for setting the flow control means in its second mode.

The invention further includes a method of stabilizing a vehicle having a frame, boom means pivotally mounted on the frame for movement through preselected vertical angles, an axle assembly mounted on the frame and including a front axle means and a rear axle means, each of the axle means being supported at its opposite ends by wheels and being shiftable relative to the frame, the method comprising the steps of permitting one of the axle means to shift relative to the frame at a first rate and selectively shifting the other axle means relative to the frame or locking the axle means relative to the frame when the boom means is below a predetermined vertical angle, and permitting the one axle means to shift relative to the frame at a second rate slower than the first rate and selectively shifting the other axle means relative to the frame when the boom means is above a predetermined vertical angle.

Other features and advantages of the invention will become apparent to those skilled in the art upon review of the following detailed description, claims and drawings.

Figure 1:
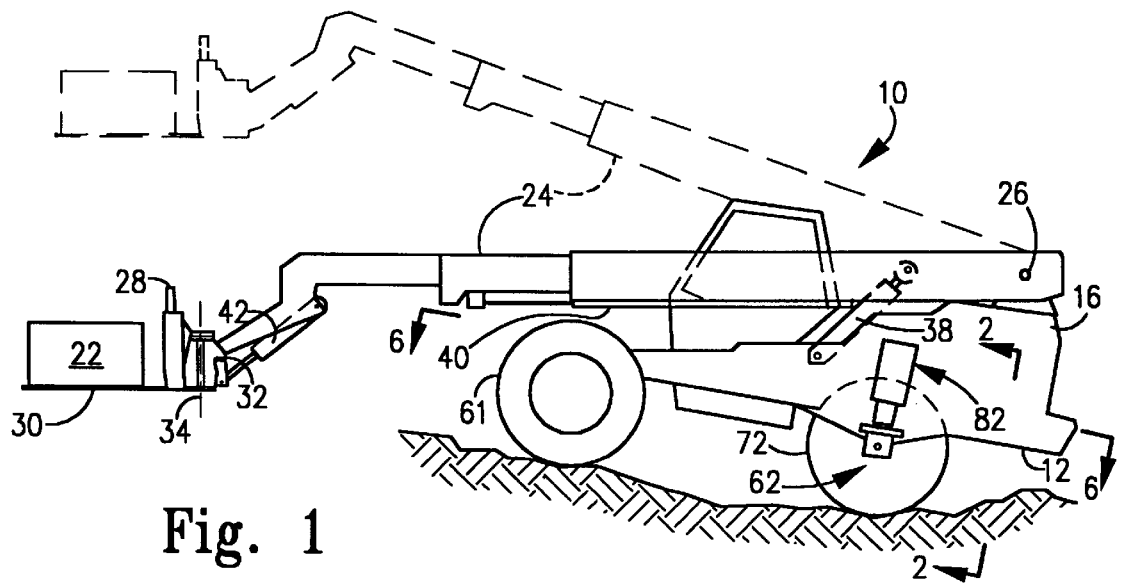
FIG. 1 is a side elevational view of a rough terrain forklift embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 6:
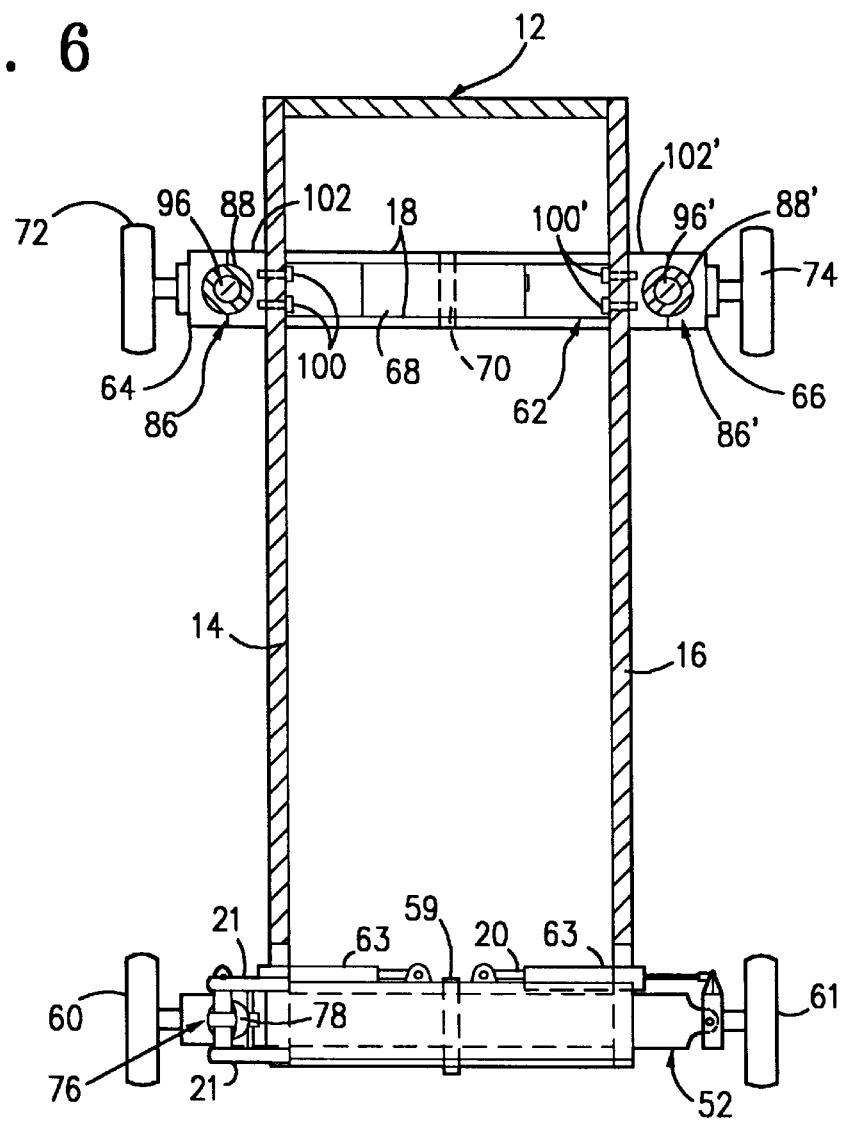
FIG. 6 is a view taken along line 6—6 in FIG. 1.

FIG. 1 illustrates a load lifting vehicle or forklift 10 which embodies the invention and which is preferably capable of traveling over rough or uneven terrain such as may be encountered at a construction site. The forklift 10 includes a main frame 12 which has a right side 14 and a left side 16, a rear pair of axle mounting members 18, and a front pair of axle mounting members 20 (FIG. 6). Axle mounting members 18 and front member 20 each extend between the right side 14 and the left side 16 of the main frame 12. In the illustrated arrangement, the main frame 12 also includes a leveling cylinder support member 21 located on the front of the main frame 12 and adjacent the right side 14 of the main frame 12.

As shown in FIG. 1, forklift 10 also includes means for manipulating a load 22. While various means for manipulating can be employed, in the illustrated arrangement, the means for manipulating includes a hydraulically-operated telescoping boom 24 which is connected at one end to the rear of the main frame 12 and which is pivotable relative to the main frame 12 about a generally horizontal axis 26 between a lowered position (shown in solid lines in FIG. 1) and a raised position (shown in broken lines in FIG. 1). The means for manipulating also includes a carriage 28 which is attached to the other end of the boom 24 and which includes forks 30 for supporting the load 22. The carriage 28 is pivotable relative to the boom 24 about a generally horizontal axis 32 and is also preferably pivotable relative to the boom 24 about a generally vertical axis 34.

Figure 2:
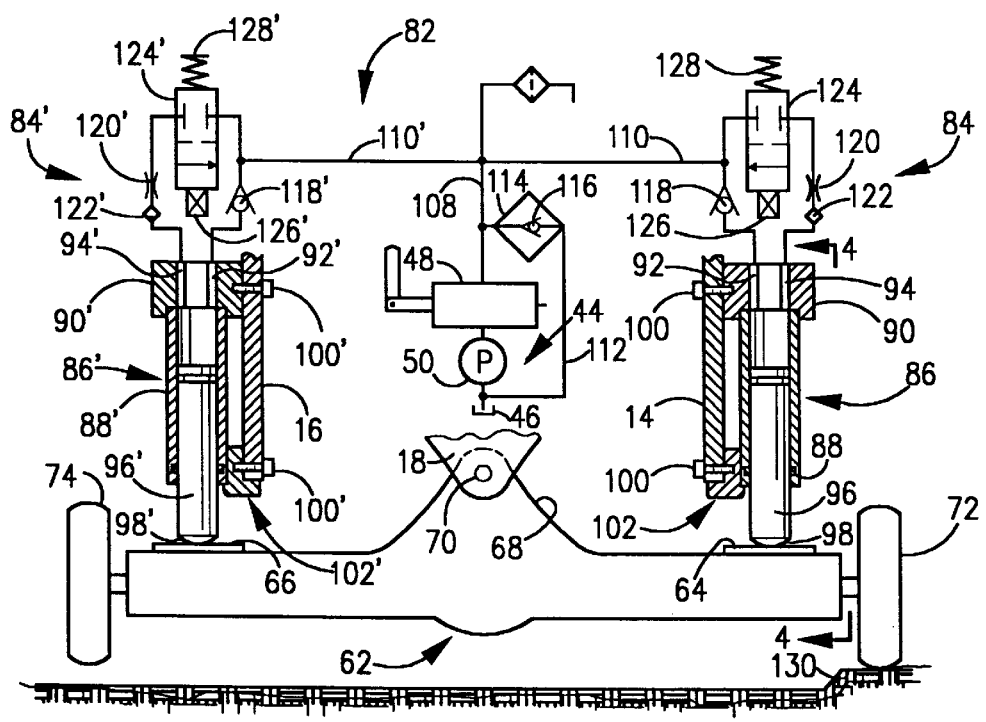
FIG. 2 is a schematic view, partially in section, taken along line 2—2 in FIG. 1 and showing the stabilizer apparatus when the forklift moves over a bump.

The means for manipulating a load 22 also includes hydraulic cylinder assemblies 38, 40 and 42, which respectively rotate or pivot the boom 24, telescope the boom 24, and tilt the carriage 28 about the horizontal axis 32. A pressurized hydraulic fluid source 44 is provided for supplying hydraulic fluid to the cylinder assemblies 38, 40 and 42. As shown in FIG. 2, the fluid source 44 includes, a fluid reservoir 46, a main valve 48 which directs fluid flow to the various hydraulic components, and a pump 50 between the reservoir 46 and the main valve 48.

Figure 7:
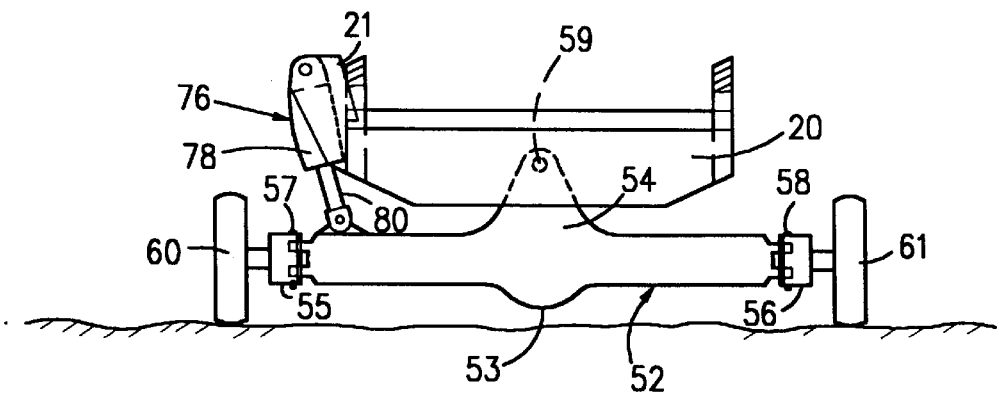
FIG. 7 is a front view of the front axle assembly shown in FIG. 6.

The forklift 10 also includes means for supporting the main frame 12 for movement along the ground. As shown in FIG. 7, the means for supporting the main frame 12 includes a front axle assembly 52 which includes a center section 53 having an upwardly extending center portion 54, and right and left end sections 55 and 56 pivotally connected to the opposite ends of the center section 53 by vertically disposed pins 57 and 58, respectively. The end sections 55 and 56 are respectively pivotable about the axes of the pins 57 and 58. Means 63 (FIG. 6) which are known in the art are provided for pivoting the end sections 55 and 56 to steer the forklift 10. A first horizontal pin 59 extending through the upper part of the front axle assembly center portion 54 and through the front axle mounting members 20 connects the front axle assembly 52 to the main frame 12 so that the front axle assembly 52 is shiftable or pivotable about the axis of the first horizontal pin 59 relative to the main frame 12. The front axle assembly 52 also includes right and left front wheels 60 and 61 for supporting the front axle assembly 52.

The means for supporting the main frame 12 also includes a rear axle assembly 62 which has opposite right and left ends each respectively including a plate 64 and 66 secured to the upper surface thereof. The rear axle assembly 62 includes a center portion 68 extending upwardly between the rear axle mounting members 18. A second horizontal pin 70 extends through the upper part of the rear axle assembly center portion 68 and through each of the rear axle mounting members 18 to connect the rear axle assembly 62 to the main frame 12. The rear axle assembly 62 is shiftable or pivotable about the axis of the second horizontal pin 70 relative to the main frame 12. Right and left rear wheels 72 and 74 each respectively support the right and left ends of the rear axle assembly 62.

Each of the axle assemblies 52 and 62 is preferably coupled through a drive train (not shown) to a forklift engine (not shown) to drive the forklift wheels 60, 61, 72 and 74.

The forklift 10 also includes means for leveling the main frame 12. While various means for leveling can be employed, in the illustrated arrangement, the means for leveling includes a double-acting, hydraulic leveling cylinder assembly 76 which is pivotally interconnected between the support member 21 and one end of the center section 53 of the front axle assembly 52 (FIG. 7). The leveling cylinder assembly 76 includes a leveling cylinder 78 and a reciprocable rod 80 at least partially disposed within the leveling cylinder 78. The leveling cylinder assembly 76 is supplied with hydraulic fluid from the fluid source 44. Fluid flow to and from the leveling cylinder assembly 76 is preferably manually controllable by the operator, such as by a conventional joy stick control. Thus, the operator can selectively extend or retract the rod 80 to level the main frame 12 to compensate for hillsides and the like.

While in the illustrated arrangement the leveling cylinder assembly 76 is secured between the front axle assembly 52 and the support member 21, in other arrangements, the leveling cylinder assembly 76 could be positioned in the rear of the forklift 10 between the rear axle assembly 62 and the main frame 12.

As shown in FIG. 2, the forklift 10 also includes means for reducing tipping or tilting, or for stabilizing the main frame 12. The means for stabilizing includes a stabilizer apparatus 82. The stabilizer apparatus 82 includes right and left stabilizing assemblies 84 and 84' respectively positioned on the right side 14 and the left side 16 of the main frame 12. Although each of the stabilizing assemblies 84 and 84' may have an arrangement different from that of the other, in the illustrated arrangement, the structure of the stabilizing assemblies 84 and 84' is substantially identical, except for being mirror images of one another, and operation of each of the stabilizing assemblies 84 and 84' is also substantially identical. Thus, only the right stabilizing assembly 84 will be described in detail. Common elements of the stabilizing assemblies 84 and 84' will be given the same reference numerals, except numerals associated with the left stabilizing assembly are identified with a prime (') notation.

The stabilizing assembly 84 includes a stabilizing cylinder assembly 86 which includes a cylinder 88, a cylinder cap 90 which is on the top of the cylinder 88 and which includes fluid ports 92 and 94, and a reciprocable ram 96 extending out from the bottom of the cylinder 88 and at least partially disposed within the cylinder 88. The ram 96 includes a rounded end 98 engaging the plate 64 on the right end of the rear axle assembly 62. The ram end 98 remains in constant, or nearly constant contact with the plate 64 during operation of the forklift 10 as will be further explained below. Likewise, the ram end 98' also remains in constant, or nearly constant contact with the plate 66 during operation of the forklift 10.

While in the illustrated arrangement the stabilizing cylinder assemblies 86 and 86' are located toward the rear of the main frame 12 and engage the rear axle assembly 62, in other arrangements, the stabilizing cylinder assemblies 86 and 86' could be located elsewhere, such as toward the front of the main frame 12, and could engage the front axle assembly 52.

The stabilizing assembly 84 also includes means for mounting the stabilizing cylinder assembly 86 on the main frame 12. While various means for mounting can be employed, in the illustrated arrangement, the means for mounting includes means for fixedly connecting the stabilizing cylinder assembly 86 to the main frame 12. In the illustrated arrangement, the means for fixedly connecting includes fasteners such as bolts 100.

The rear axle assembly 62 is capable of exerting upwardly directed loads on the stabilizing cylinder assembly 86 through the ram 96 so that the stabilizing cylinder assembly 86 acts as a load-bearing member for transferring a load from the rear axle assembly 62 to the main frame 12. To accommodate the load which the stabilizing cylinder assembly 86 bears, the means for mounting the stabilizing cylinder assembly 86 on the main frame 12 also includes load carrying means for transferring at least part of the upwardly directed load on the stabilizing cylinder assembly 86 directly to the main frame 12. In the illustrated arrangement the load carrying means includes a shoe 102 which is preferably integrally formed.

Figure 5:
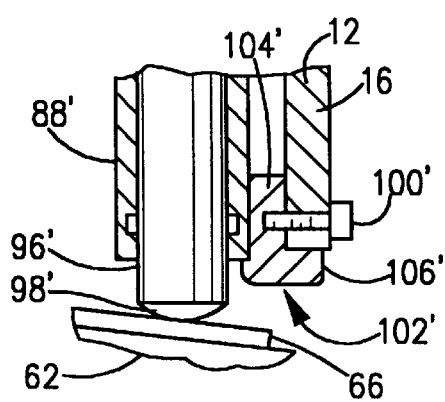
FIG. 5 is an enlarged partial view of the axle stabilizer apparatus shown in FIG. 3.

The shoes 102 and 102' are preferably identical and will be described with respect to shoe 102'. As shown most clearly in FIG. 5, the shoe 102' includes a body portion 104' which is fixed to the cylinder 88' by means such as welding, and which is secured to the main frame 12 by at least one of the bolts 100'. The shoe 102' also includes a flange portion 106' projecting from the body portion 104' and extending under and engaging a portion of the main frame 12. An upwardly directed load transmitted through the ram 96' is at least partially mechanically transferred directly to the main frame 12 through the flange portion 106', thereby reducing the shear load on the bolts 100'.

As shown in FIG. 2, pressurized hydraulic fluid for operating the stabilizing cylinder assembly 86 is supplied by the pressurized hydraulic fluid source 44 through a main fluid line 108 leading from the main valve 48, and also through a second fluid line 110 leading from the main line 108. Fluid returning to the fluid reservoir 46 from the stabilizing cylinder assembly 86 bypasses the pump 50 and the main valve 48 via fluid return line 112. A first filter 114 located in the return line 112 preferably includes a bypass valve 116 to maintain a constant pressure in the lines 108 and 110 of approximately 25–50 psi.

A one way or check valve 118 is located between the second fluid line 110 and the fluid port 92. Fluid flow to the cylinder 88 through the check valve 118 is permitted, while fluid flow from the cylinder 88 through the check valve 118 is prevented. In the event the rear axle assembly 62 moves in a direction away from engagement with the ram end 98 (FIG. 3), fluid flow through the check valve 118 to the cylinder 88 facilitates extension of the ram 96 to maintain contact between the ram end 98 and the plate 64.

The stabilizing assembly 84 is provided with means for restricting fluid flow from the cylinder 88. The means for restricting is in parallel with the check valve 118 and is located between the second fluid line 110 and the fluid port 94. While various means for restricting can be employed, in the illustrated arrangement, the means for restricting includes a restriction orifice 120. The restriction orifice 120 restricts fluid flow from the cylinder 88 to substantially slow retraction of the ram 96 within the cylinder 88. In the event the rear axle assembly 62 attempts to move against the ram 96, thereby exerting an upwardly directed force on the ram 96, slowed retraction of the ram 96 will impede movement of the rear axle assembly 62, so that the rear axle assembly 62 becomes generally rigid and shifts only very slowly with respect to the main frame 12. The restriction orifice 120 is preferably of a size which does not interfere to any appreciable degree with the leveling of the frame 12 by the leveling cylinder assembly 76. A second fluid filter 122, is provided between the restriction orifice 120 and the port 94.

Figure 3:
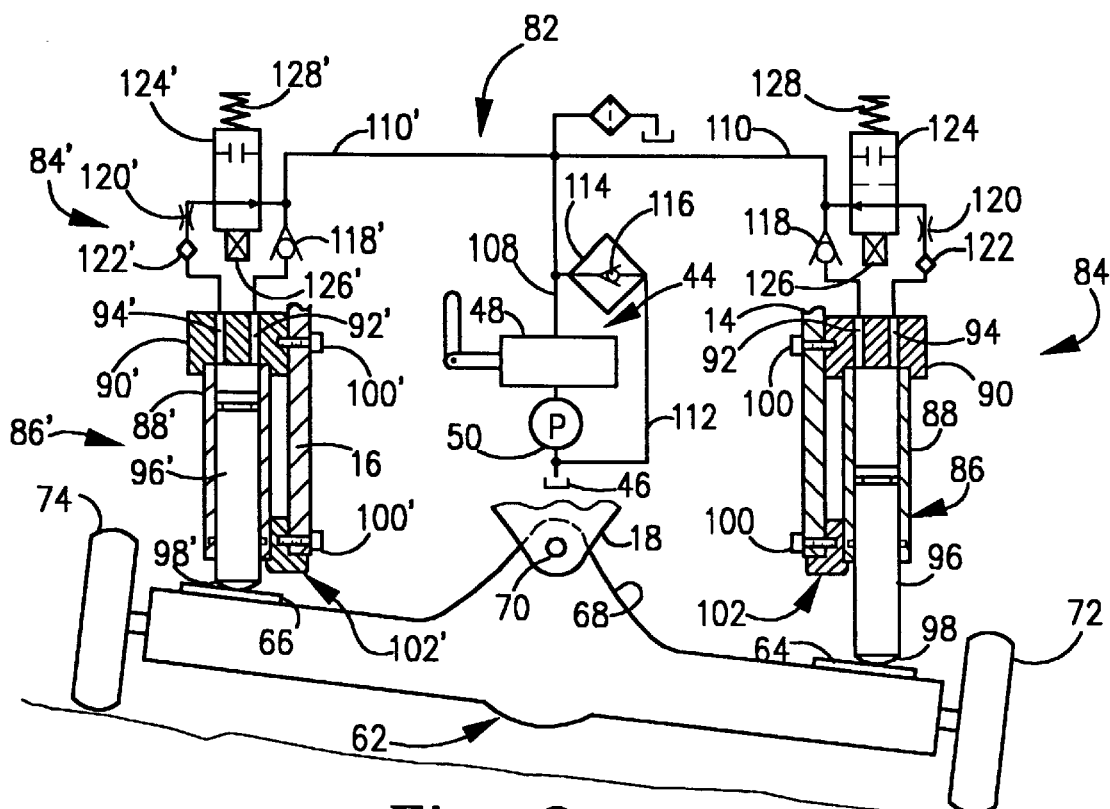
FIG. 3 is a view similar to FIG. 2 and showing the stabilizer apparatus when the forklift is on an inclined surface.
Figure 4:
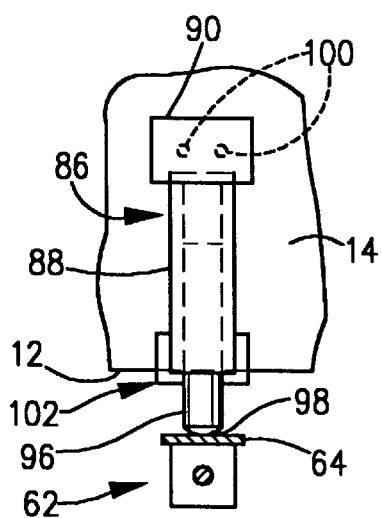
FIG. 4 is a view taken along line 4—4 in FIG. 2.

While in some arrangements the means for restricting can include only the restriction orifice 120, such as is preferred in arrangements wherein the carriage 28 is not pivotable relative to the boom 24 about a generally vertical axis such as the axis 34, in the illustrated arrangement, the means for restricting also includes a flow control valve 124 which is positioned between the restriction orifice 120 and the second fluid line 110. The use of a flow control valve 124 is preferred in arrangements which include a carriage 28 that is pivotable relative to the boom 24 about a generally vertical axis, such as the axis 34, as will be further explained below. The flow control valve 124 is shiftable between a first position wherein fluid flow through the flow control valve 124 is blocked (FIG. 2), and a second position wherein fluid flow through the flow control valve 124 is permitted (FIG. 3). When the flow control valve 124 is in the first position, fluid flow is prevented both to and from the stabilizing cylinder assembly 86 through the flow control valve 124, so that the ram 96 cannot retract into the cylinder 88 in response to movement of the rear axle assembly 62. Thus, when the flow control valves 124 and 124', are each in the first position the rear axle assembly 62 becomes rigid and generally immoveable relative to the main frame 12. When the flow control valve 124 is in the second position, fluid flow from the stabilizing cylinder assembly 86 is permitted so that the ram 96 can retract into the cylinder 88 at the rate permitted by the restriction orifice 120.

While in the illustrated arrangement the restriction orifice 120 and the flow control valve 124 are separate, in other arrangements, the restriction orifice 120 could be incorporated into the flow control valve 124 such that the orifice 120 is in use when the flow control valve 124 is in the second position.

Means are provided for shifting the flow control valve 124 between the first and second positions. While various means for shifting can be employed, in the illustrated arrangement, the means for shifting includes a solenoid 126. Although the solenoid 126 can be actuated to shift the flow control valve 124 in response to a variety of conditions, and although actuation of the solenoid 126 can be automatic or manual, in the illustrated arrangement, the solenoid 126 is automatically actuated to shift the flow control valve 124 to the first position in response to movement of the boom 24 to the raised position. Preferably, the solenoid 126 is activated to shift the flow control valve 124 to the first position when the boom 24 forms an angle of about 10 degrees or more with the horizontal. When the boom 24 is in a lowered position and forms an angle of less than 10 degrees with the horizontal, the solenoid 126 is deactivated and the flow control valve 124 remains in, or is returned to the second position by a spring 128.

FIG. 2 illustrates the operation of the stabilizer apparatus 82 when the rear axle assembly 62 encounters an obstruction such as a bump 130. In FIG. 2, the flow control valves 124 and 124' are shown in the first or blocked position, i.e., the boom 24 is in the raised position, and the right rear wheel 72 is shown on the bump 130 while the surface beneath the left rear wheel 74 is relatively flat. Blocking the exit of fluid from the stabilizing cylinder assembly 86 prevents retraction of the ram 96 when the bump 130 is encountered so that the rear axle assembly 62 is maintained in a fixed position relative to the main frame 12 and tipping, tilting or rocking of the main frame 12 is reduced or prevented. The rear wheels 72 and 74 rise and fall together when an obstruction is encountered and the forklift 10 is supported on the three wheels 60, 61 and 72 until the wheel 72 moves off the bump 130.

Had the flow control valves 124 and 124' of FIG. 2 been in the second position rather than in the first position as shown, the rear axle assembly 62 would still have been maintained in a generally rigid position relative to the main frame 12 as the right rear wheel 72 passed over the bump 130. As fluid flow from the cylinder 88 is severely restricted by the restriction orifice 120, retraction of the ram 96 within the cylinder 88 is severely impeded, thereby preventing or at least significantly slowing rotation of the rear axle assembly 62 when the wheel 72 travels over the bump 130. Thus, when the flow control valves 124 and 124' are in the second position and one of the rear wheels 72 and 74 encounters a transient obstruction such as the bump 130, the rear axle assembly 62 is maintained in substantially the same position it was in prior to encountering the bump 130 so that the main frame 12 is not caused to tip. If the forklift 10 had come to rest with the right rear wheel 72 on the bump 130, the rear axle assembly 62 would pivot very slowly relative to the main frame 12 until the left rear wheel 74 contacted the ground.

FIG. 3 shows the rear axle assembly 62 on an inclined surface when the flow control valves 124 and 124' are in the second position, i.e. when the boom 24 is in the lowered position. Referring specifically to stabilizing cylinder assembly 86' in FIG. 3, as the inclined surface urges the rear axle assembly 62 to rotate in a clockwise direction (as viewed in FIG. 3) against the ram 96', fluid is permitted to exit the cylinder 88' through the flow control valve 124' and the restriction orifice 120', thereby allowing the ram 96' to very slowly retract within the cylinder 88'. The very slow retraction of the ram 96' allows the rear axle assembly 62 to adapt to contour changes in the terrain which are not merely transient, such as hillsides for example.

Referring specifically to stabilizing cylinder assembly 86 in FIG. 3, as the rear axle assembly 62 rotates in a clockwise direction (as viewed in FIG. 3), fluid flow through the check valve 118 permits the ram 96 to extend from the cylinder 88 so that the ram end 98 remains in constant or nearly constant contact with the plate 64. The rounded end 98 of the ram 96 facilitates sliding contact with respect to the plate 64 so that only a generally upwardly directed load is exerted on the ram 96 by the rear axle assembly 62.

When the forklift 10 is being driven from place to place, it is desirable that the boom 24 be in the lowered position so that the flow control valves 124 and 124' are in the second position and the rear axle assembly 62 is permitted to slowly shift relative to the main frame 12 to follow the contour of non-transient terrain features. Allowing the rear axle assembly 62 to slowly shift to conform to hillsides and the like reduces the risk of forklift roll over. At the same time, when the flow control valves 124 and 124' are in the second position, 64 the rear axle assembly 62 remains generally rigid relative to the main frame 12 when one of the rear wheels 72 and 74 travels over transient terrain features such as holes or the bump 130. This reduces or prevents tipping of the main frame 12. When the flow control valves 124 and 124' are in the second position the leveling cylinder assembly 76 can be operated to maintain the main frame 12 in a level position.

Before the boom 24 is elevated to the raised position to raise a load 22 or to pick up a load 22 which is already raised, the main frame 12 can be leveled by manually operating the leveling cylinder assembly 76. Leveling of the main frame 12 when the boom 24 is elevated and the rear axle assembly 62 is rigid relative to the main frame 12 can cause undue stress on the leveling cylinder assembly 76, can possibly raise one of rear wheels 72 and 74 off the ground, or can twist the main frame 12. Once the main frame 12 is leveled the boom 24 can be raised.

The leveling cylinder assembly 76 can be operated to substantially fix the front axle assembly 52 relative to the main frame 12. If the rear axle assembly 62 is shiftable relative to the main frame 12 and the front axle assembly 52 is in a fixed position relative to the main frame 12, the main frame 12 will be generally supported against tipping to the left or right by the front axle assembly 52. In addition, the weight of the main frame 12, the boom 24 and the load 22 will be supported by the front axle assembly 52 and also by the rear axle assembly 62 at the point of attachment of the rear axle assembly 62 to the main frame 12. If the carriage 28 and the load 22 it supports are pivoted about the generally vertical axis 34, the center of gravity of the load 22 will be shifted so that the load 22 may be supported predominantly by only one end of the front axle assembly 52 and by the rear axle assembly 62 at its point of attachment to the main frame 12. Shifting of the rear axle assembly 62 under these circumstances could cause the main frame 12 to tip, or even roll over in severe cases where the load 22 is very heavy. When the rear axle assembly 62 is fixed relative to the main frame 12, as is the case when the flow control valves 124 and 124' are in the first position, the main frame 12 is further stabilized against tipping. Thus, the possibility that the main frame 12 will tip as a result of an eccentric load 22 which is created by the pivoting of the carriage 28 about the vertical axis 34 is reduced.

In the event the carriage 28 is not pivotable about the generally vertical axis 34 and the stabilizer apparatus 92 does not include flow control valves 124 and 124', the main frame 12 can be leveled when the boom 24 is in either of the raised or lowered positions. The forklift 10 also avoids the risk of tipping which is caused by an eccentric load 22 on the end of the boom 24 and which could result if the carriage 28 were otherwise pivotable about the vertical axis 34.

Figure 8:
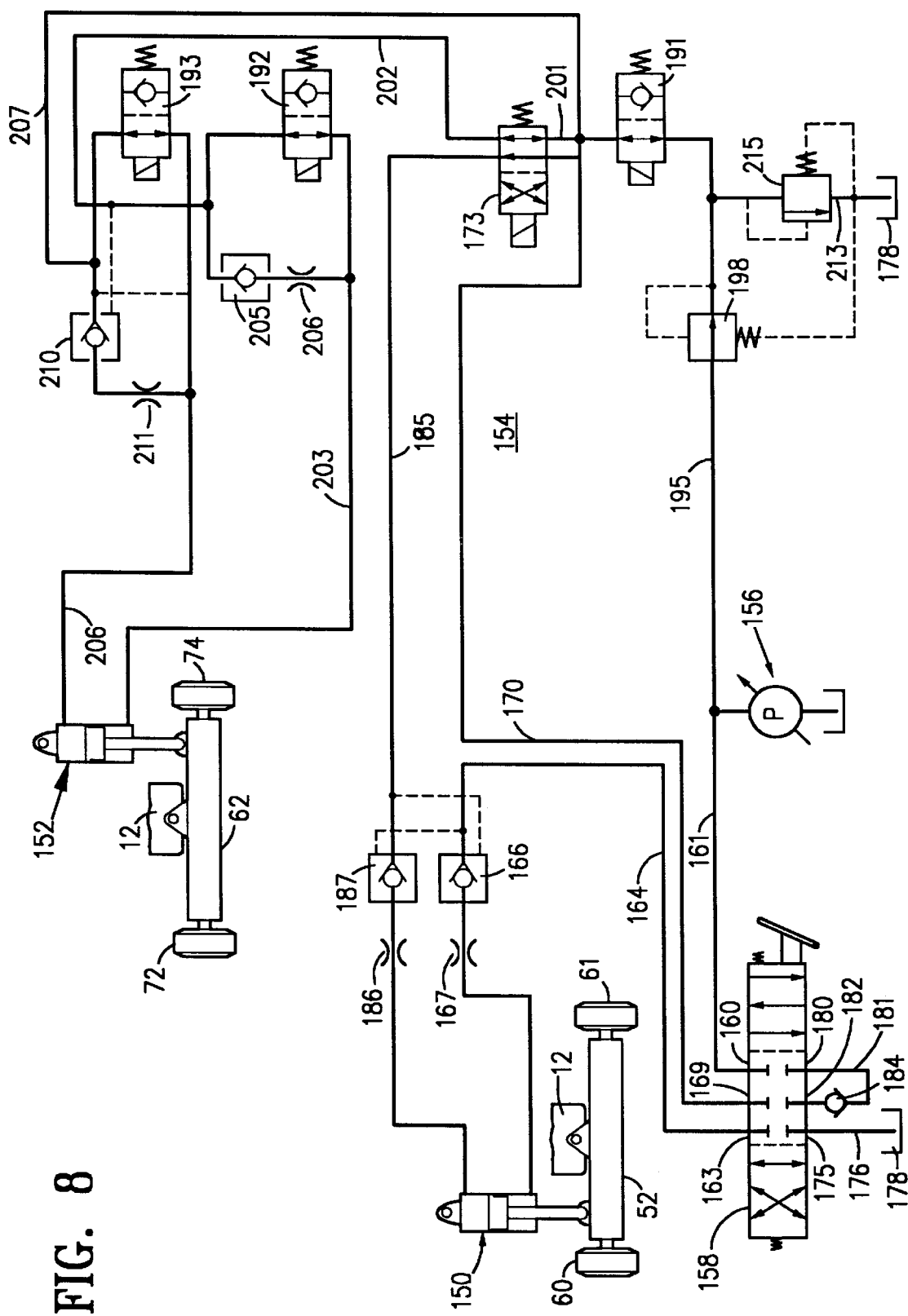
FIG. 8 schematically illustrates an alternate embodiment of the invention.

FIG. 8 shows an alternate embodiment of the invention wherein the stabilizing apparatus includes a first double-acting frame tilt cylinder 150 pivotally connected to one end of the front axle assembly 52 and a second double-acting frame stabilizer cylinder 152 is pivotally connected to the opposite end of the rear axle assembly 62. Accordingly, the cylinders 150 and 152 are connected to the axle assemblies 52 and 62 at the diametrically opposite corners of the frame 12. It will be appreciated that the base ends of each of the cylinders 150 and 152 are pivotally connected to the frame 12 in the manner illustrated in FIGS. 6 and 7, for example.

A hydraulic circuit 154 having first and second modes couples the cylinders 150 and 152 to a source of hydraulic pressure, such as a pump 156. In its first mode, such as, for example, when the boom 28 is below a predetermined vertical angle, the frame tilt cylinder 150 locks the front axle assembly 52 unless manually operated and the frame stabilizer cylinder 152, coupled to the opposite end of the rear axle assembly 62, is free to float. In its second mode, when the boom 28 is elevated above the predetermined angle, the hydraulic circuit 154 is in its second mode wherein both cylinders 150 and 152 are locked unless manually operated to tilt frame 12. However, in its latter mode, under normal operation, tilting movement of the frame 12 is at a substantially lower speed than when the hydraulic circuit 154 is in its first mode.

When the ignition of forklift 12 is turned "on", and the boom 24 is below a predetermined angle, each of the solenoids of valves 191, 192 and 193 are energized to connect their through passages to its ports while the valve 173 is de-energized so that its ports are connected directly by through passages thereby connecting conduit 170 to conduit 185 and conduit 201 to conduit 202. Unless manually operated, the valve 158 is centered by springs so that its ports are disconnected. This is the condition of the hydraulic control 154 as shown in FIG. 8. As a result, cylinder 150 is locked while cylinder 152 is floating so that axle assembly 62 can tilt.

Assume that while the hydraulic circuit is in its first mode, so that cylinder 152 is floating, the rear axle assembly 62 is tilted counter-clockwise as a result of wheel 74 hitting a bump or wheel 72 a depression, for example. This moves the piston in cylinder 152 upwardly, forcing hydraulic fluid to flow from the base end through conduit 206, valve 193, conduit 207, and to the conduit 201. A first portion of the fluid will pass upwardly through conduit 202, valve 192, conduit 203 and to the rod side of cylinder 152. However, because the rod side of cylinder 152 cannot accept all of the hydraulic fluid from the base side, a second portion of the hydraulic fluid will pass through valve 191, pressure relief valve 215, conduit 213 and to the sump 178.

On the other hand, should the axle 62 be pivoted clockwise, fluid forced from the rod side of the cylinder 152 will flow through conduit 203, valve 192, conduit 202, valve 173, conduit 207, valve 193, and conduit 206 to the base side of cylinder 152. However, because the base side of cylinder 152 can accept more hydraulic fluid than that discharging from the rod side, make-up fluid will flow from pump 156 through conduit 195, pressure reducing valves 197 and 198 and valve 191 to conduit 207 and thence to the base side of cylinder 152. The pressure reducing valves 197 and 198 will sense a drop in pressure because base side of cylinder 152 can receive more hydraulic fluid than that flowing from the rod side. As a result, conduit 201 will be connected to the pump through valve 191 and pressure reducing valves 197 and 198 so that the requisite make-up oil to the base side of cylinder 152 will be provided.

If it is desired to pivot the front axle assembly 52 relative to the frame 12, the frame tilt valve 158 is manually operated. Movement of the valve 158 to the left will connect the pump 156 to the base side of cylinder 150 through conduit 161, valve 158, conduits 181 and 170, valve 173, conduit 185, check valve 187 and orifice 186. The rod side of cylinder 150 is connected to the sump 178 through conduits 164 and 176, orifice 167, check valve 166 (piloted open by the pressure in conduit 185). This will tilt the axle assembly 52 counter-clockwise as viewed in FIG. 8.

Movement of the valve 158 to the right connects port 163 to port 182, port 169 to port 175 and port 160 to port 180. As a result, the pump 156 is connected to the rod side of cylinder 150 and the base side of cylinder 150 is connected to the sump 178. This tilts the axle assembly 52 clockwise as viewed in FIG. 8.

In this manner, when the hydraulic circuit is in its first mode, that is, when the boom 28 is below the predetermined vertical angle, the front axle assembly 52 may either be locked or tilted relative to the frame 12 while the rear axle assemble 62 is free to float. This allows the frame to tilt as the vehicle 12 moves over uneven terrain and with the boom 28 down. The speed at which the front axle 52 tilts is controlled by the orifices 167 and 186.

When the boom 28 is elevated above the predetermined angle, such as 40° for example, an interlock (not shown) de-energizes the solenoids of valves 191, 192 and 193 so that each of the valves is moved by their respective springs to a position wherein check valves are disposed between their ports. In addition, valve 173 is energized so that it is moved to the right as viewed in FIG. 8. This connects conduit 170 to conduit 202 and conduit 185 to conduct 201. However, when the valve 158 is in its neutral position, cylinder 150 is disconnected from the pump 156, while the check valves in valves 192 and 193 prevent the flow of hydraulic fluid between the rod and base sides of cylinder 152. As a result, both cylinders are locked to the frame. In this mode, the center of gravity is less likely to move outside the base formed by the wheels 60, 61, 72 and 74 than if the axle assembly 62 is free to tilt.

With the boom 28 elevated, it may be necessary to tilt the frame 12, such as, for example, if it is necessary to shift the load slightly in the horizontal direction for alignment purposes. This is accomplished by operating the frame tilt valve 158. Specifically, movement of the valve 158 toward the right connects the rod side of cylinder 150 to the pump 156 through orifice 167, valve 166, conduit 164, valve 158, conduits 181 and 161. The base side of cylinder 150 is connected to the base side of cylinder 152 through a path defined by orifice 186, check valve 187, conduit 185, valve 173, conduits 201, conduit 207, check valve 210, orifice 211 and conduit 206. The rod side of cylinder 150 is connected to the sump 178 through a path defined by conduit 203, orifice 206, check valve 205 (which is piloted opened by the pressure in conduit 207), conduit 202, valve 173, conduit 170, valve 158 and conduit 176. This will rotate both of the axle assemblies 52 and 62 clockwise as viewed in FIG. 8.

If it is desired to rotate the axle assemblies 52 and 62 in the counter-clockwise direction, the frame tilt valve 158 is moved to the left as viewed in FIG. 8. This connects the pump 56 to the rod side of cylinder 152 through a path defined by conduit 161, valve 158, conduit 181, conduit 170, valve 173, conduit 202, check valve 205, orifice 206, and conduit 203. The base side of cylinder 152 is connected to the base side of cylinder 150 through a path defined by conduit 206, orifice 211, check valve 210 (which is piloted open by the pressure in conduit 202), conduit 207, conduit 201, valve 173, conduit 185, check valve 187 and orifice 186. The rod side of cylinder 152 is connected to the sump through orifice 167, check valve 166 (which is piloted open by the pressure in conduit 185), conduit 164, valve 158 and conduit 176.

It can be seen that in the second mode of operation, when the boom 28 is above the critical angle, flow through each of the valves 191, 192 and 193 is checked so that the hydraulic fluid must pass through orifices 206 and 211. These orifices are sized to restrict fluid flow so that in the second mode, tilting movement of the axle assemblies 52 and 62 is about one-third the speed that axle assembly 62 tilts in the first mode. This is possible because one of the cylinders 150 or 152 is slaved to the other depending upon the position of valve 158. As a result, frame tilting motion is relatively slow, thereby minimizing the possibility of tipping.

While the embodiment shown in FIG. 8 includes two double-acting cylinders, 150 and 152, those skilled in the art will appreciate that a pair of single-acting cylinders coupled to each axle may also be employed.

Figure 9:
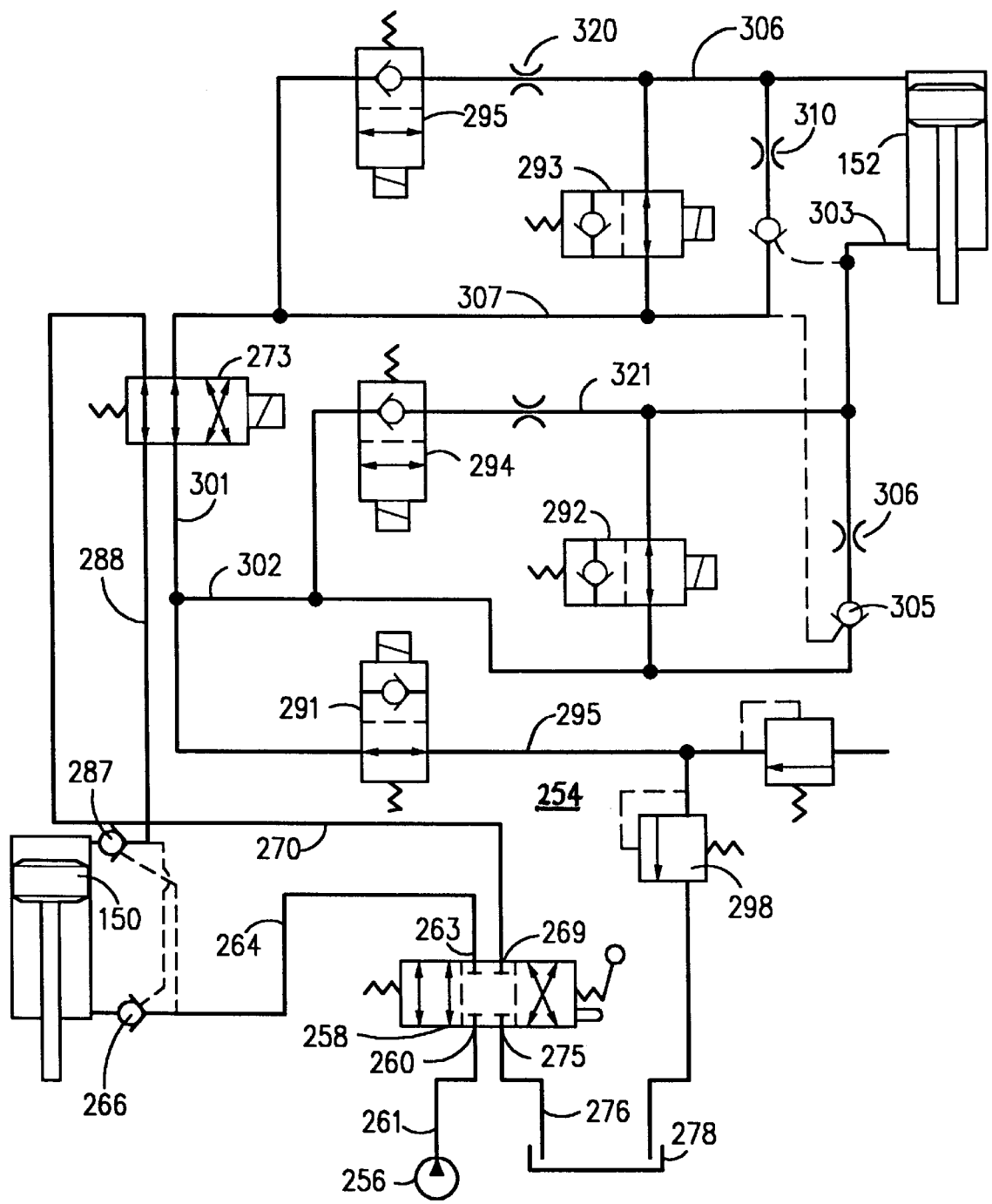
FIGS. 9 and 10 illustrate an alternate embodiment of the invention.
Figure 10:
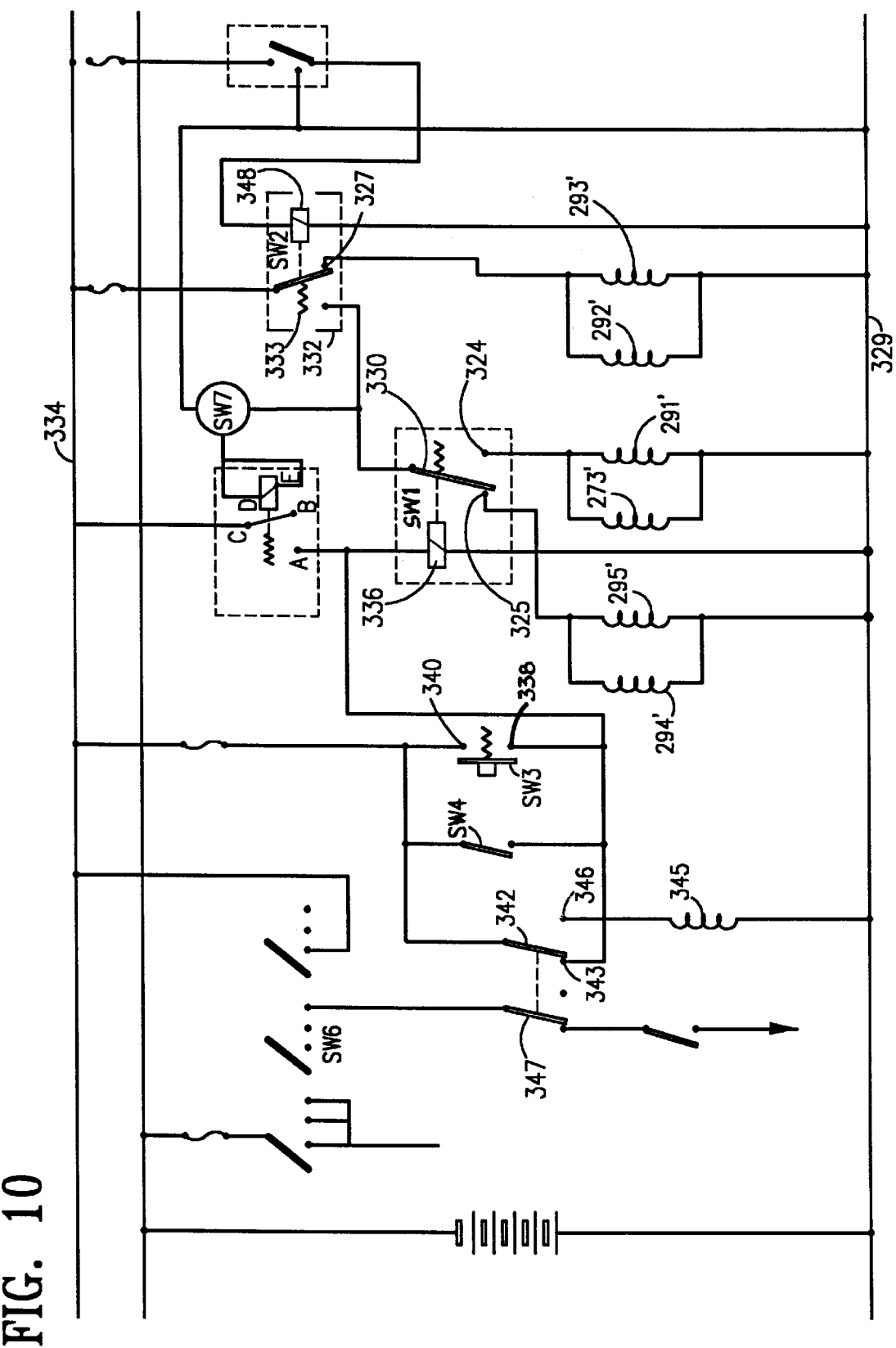

FIGS. 9 and 10 show an alternate embodiment of the invention which includes a hydraulic control system 254 for controlling frame tilting speed and rear axle tilting depending upon the angular position of the boom 24 and whether the vehicle's braking system is engaged. Moreover, frame tilting is overridden if the vehicle tilts a predetermined angle from the vertical. The hydraulic system 254 controls the flow of hydraulic fluid from a pump 256 to the double-acting frame tilt cylinder 150 connected to one end of the front axle assembly 52 and a second double-acting frame stabilizer cylinder 152 connected to the opposite end of the rear axle assembly 62.

As seen in FIG. 9, the hydraulic circuit 254 includes a manually operable, two-way, three-position tilt valve 258 having a first port 260 connected by a conduit 261 to the pump 256; a second port 263 connected by conduit 264 to the rod side of cylinder 150 through check valve 266; a third port 269 connected by conduit 270 to a first port of a solenoid-operated control valve 273; and a fourth port 275 connected by conduit 276 to the sump 278. The base side of cylinder 150 is connected through check valve 287 and conduit 288 to a second port of control valve 273.

The hydraulic control circuit 254 also includes one-way, two-position solenoid-operated valves 291, 292, 293, 294 and 295 for controlling the flow of hydraulic fluid to the frame stabilizer cylinder 152. Valves 292, 293, 294 and 295 are normally closed, that is, when energized, each provides a through passage between their inlet and outlet ports and when de-energized are returned by their respective springs to an alternate position wherein there is a check valve between said ports. Valve 291 is normally open so that, when de-energized, it provides a through passage and when energized a check valve is positioned between its ports. Valve 273 provides parallel flow when de-energized and cross flow when energized.

A first conduit 295 connects one port of valve 291 to the pump 256 through pressure-relief valve 298 and second and third conduits 301 and 302, respectively, connect the other port of valve 291 to a second port of valve 273 and to a first port of valve 292, the other port of which is connected by conduit 303 to the rod side of cylinder 152. A check valve 305 and an orifice 306 are connected between conduits 302 and 303. The base side of cylinder 152 is connected by conduit 306 to a first port of valve 293 while its other port is connected by conduit 307 to a fourth port of valve 273. A check valve 310 and orifice 311 connect conduit 306 to conduit 307 and bypass valve 293. Valve 294 and orifice 320 are connected between conduits 302 and 303, and valve 295 and orifice 321 are connected between conduits 302 and 303.

FIG. 10 is an electrical schematic for the embodiment of FIG. 9. Here, it can be seen that the coils of solenoid valves 273 and 291 are connected in parallel, as are the coils of valves 292 and 293 and the coils of valves 294 and 295. For purposes of identification, the coils of these valves will be identified by the same reference numeral as that used for the valve, but will be distinguished by a prime ('). The parallel combination of coils 273' and 291' is connected to a first contact 324 of solenoid-operated stabilizer lock switch SW1 and the parallel combination of coils 294' and 295' is connected to the second contact 325 of stabilizer lock relay SW1. One end of the parallel combination of relay coils 292' and 293' is connected to a first contact 327 of a boom switch relay SW2. The other ends of each of the coils 273' and 291'–295' are connected to the negative bus 329.

The movable contact 330 of switch SW1 is connected to the second stationary contact 332 of relay SW2 and the movable contact 333 of switch SW2 is connected to the positive supply bus 334.

The coil 336 of relay SW1 is connected between the negative bus 329 and one terminal 338 of a service brake switch SW3. The other terminal 340 of switch SW3 is connected to the positive bus 334. Connected in parallel with SW3 is a neutral switch SW4 and the wiper 342 and stationary contact 343 of double-pole double-throw park brake switch SW5. A parking brake valve coil 345 is connected between the negative bus 329 and a second contact 346 of switch SW5. The vehicle 10 may be stopped by operation of the service brake or the parking brake in a manner well-known in the art. In either case, operation of the service brake or the parking brake will close the respective switches SW3 or SW4.

The wiper 347 of the other pole of switch SW5 is operative to connect and disconnect a starter solenoid to the ignition switch SW6. Operation of the ignition switch couples the positive bus 334 to the positive terminal of the battery B. Finally, the boom relay switch coil 348 is coupled to the negative bus 329 and to the positive bus 334 through a proximity switch 350.

The proximity switch 350 is normally open and is closed when the boom is elevated above a predetermined angle. When the boom 29 is down, the boom relay switch SW2 and the stabilizer lock relay SW1 are both de-energized so that the movable contacts 330 and 333 are in the position shown in FIG. 10. As a result, solenoid valve coils 292' and 293' are energized and coils 273', 291', 294' and 295' are de-energized, whereby the valves are in the position shown in FIG. 9 with valves 292, 293, and 291 open to flow, valve 273 set for parallel flow, and valves 294 and 295 are closed. As a result, the opposite ends of the rear cylinder 152 are connected through the path defined by conduit 306, valve 293, conduit 307, valve 273, conduits 301 and 302, valve 292, and conduit 303. The front cylinder 150 may be manually frame-tilted by operation of the valve 258 in the manner discussed with respect to the embodiment of FIG. 8.

If the boom is elevated above a predetermined angle while the vehicle is in motion, proximity switch 350 is closed to energize the coil 348 of switch SW1. This will actuate the solenoid to move wiper 333 from contact 327 to contact 332. As a result, solenoid coils 292' and 293' are de-energized and solenoid coils 294' and 295' are energized. This opens valves 294 and 295 to flow and sets valves 292 and 293 to block flow. The opposite ends of cylinder 152 are thus connected through a path which includes orifices 320 and 321 so that while the rear axle remains free to float, its movement is dampened. The tilting of the front axle may be achieved by operation of valve 258 as described above.

The vehicle 10 may be stopped either by operating the service brake, which closes the service brake switch SW3; actuating the parking brake switch, which steps switch SW5; or placing the vehicle's transmission in neutral, which closes switch SW4. In any event, the stabilizer lock relay is stepped from contact 325 to contact 324. This de-energizes coils 294' and 295' to close valves 294 and 295. If the boom 24 is down so that movable contact 333 of switch SW2 is on contact 327, coils 273' and 291' remain de-energized so that valve 273 is in parallel flow mode and valve 291 is open. The rear axle 62 remains free to react to the terrain and the front axle 52 may be tilted by operation of valve 258.

If the vehicle is stopped when the boom is up, that is, when proximity switch 350 is operated to energize coil 348 of switch SW2 so that movable contact 333 is on stationary contact 332, and relay coil 336 is energized so that movable contact 330 of switch SW1 is on contact 324 as a result of the closure of switches SW3, SW4 or SW5. In this condition, valves 291–295 will all be closed, that is, with a check valve between their outlet ports, and valve 273 will be set for cross flow. With the valves set in this position, the rear cylinder 152 is locked in position, since flow between its opposite ends is blocked by check valve 311, valves 292–295, and the cross-flow position of valve 273. If the front axle is tilted by operation of valve 258, the rear cylinder 152 is slaved to the front cylinder 150 through a path defined by conduit 288, valve 273, valve 311, So orifice 310, conduit 303, orifice 306, valve 305, conduits 302 and 301, and valve 273. As a result, both frame tilting of the front and rear axles 52 and 62 are dampened.

An inclination switch SW7 is connected between terminal 330 of SW1 and ground 329 and "E" of inclination relay "IRI". The switch SW7 is of a well-known type which closes when the vehicle tilts at a predetermined angle, such as 3°–4°, for example. As a result, if the vehicle tilts when the boom is up so that proximity switch 350 is closed and the vehicle is moving, switch SW7 will close to energize coil IRI. This moves contact "C" to contact "A" energizing SWI moving contact 330 to contact 324, closing valves 291'–295' and placing valve 273 in its cross flow position so that the rear axle is locked. In this manner, if the angle of inclination approaches a critical value, the rear axle is locked to provide a more stable platform and thereby minimized the tendency for the vehicle to tip.

Various features of the invention are set forth in the following claims.

We claim:
1. A vehicle including
   a frame,
   a front axle supported at the opposite ends thereof by wheels and connected to said frame for shiftable movement relative thereto,
   a rear axle supported at the opposite ends thereof by wheels and connected to said frame for shiftable movement relative thereto, and
   a stabilizer apparatus including
      a pressure source,
      first and second fluid-actuated stabilizer assemblies connected respectively to said front and rear axles,
      wherein in the absence of pressurization by said pressure source, one of said first and second stabilizer assemblies is locked against extension and contraction, and the other of said first and second stabilizer assemblies is free to extend and contract, and
      a hydraulic circuit connected between said pressure source and said first and second fluid activated stabilizer assemblies and including
         a flow controller operable between
            a first mode wherein said pressure source is disconnected from said first and second stabilizer assemblies, whereby said one of said stabilizer assemblies is locked against extension and retraction, thereby locking said axle connected thereto against shifting movement relative to said frame, and whereby said other of said stabilizer assemblies is free to extend and retract, thereby permitting shifting movement relative to said frame of said axle connected thereto, and
            a second mode wherein said pressure source is selectively connected to said first and second stabilizer assembles for selective pressurization thereof by said pressure source so as to selectively extend and retract said first and second stabilizer assemblies.
2. The vehicle set forth in claim 1 wherein said hydraulic circuit includes flow restricting means operable, when said flow controller is in said second mode, for restricting fluid flow to at least one of said stabilizer assemblies to retard the speed of tilting of at least one of said axles, and wherein when said flow controller is in said second mode, said first and second stabilizer assemblies are selectively locked.

3. The vehicle set forth in claim 1 wherein said hydraulic circuit includes flow restricting means operable, when said flow controller is in said second mode, for restricting fluid flow to at least one of said stabilizer assemblies to retard the speed of tilting of at least one of said axles, and wherein when (1) said flow controller is in said second mode and (2) said pressure source is connected to said first and second stabilizer assemblies for selective pressurization thereof, said first and second stabilizer assemblies tilt said front and rear axles.

4. The vehicle set forth in claim 1 further including a boom, and means for pivoting said boom through a predetermined vertical angle, wherein said flow controller includes means for setting said flow controller in said first mode when said boom is below said predetermined angle and for setting said flow controller in said second mode when said boom is above said predetermined angle, and wherein when said flow controller is in said second mode, said first and second stabilizer assemblies are locked unless said pressure source is selectively connected to said first and second stabilizer assemblies for selective pressurization thereof.

5. The vehicle set forth in claim 1 further including a boom, and means for pivoting said boom through a predetermined vertical angle, wherein said flow controller includes means for setting said flow controller in said first mode when said boom is below said predetermined angle and for setting said flow controller in said second mode when said boom is above said predetermined angle, and wherein when (1) said flow controller is in said second mode and (2) said pressure source is selectively connected to said first and second stabilizer assemblies for selective pressurization thereof, said first and second stabilizer assemblies tilt said front and rear axles.

6. The vehicle set forth in claim 1 further including a boom, and means for pivoting said boom through a predetermined vertical angle, wherein said flow controller also includes sensing means for sensing when said boom is elevated above said predetermined angle for setting said flow controller in said second mode, and wherein when said flow controller is in said second mode, said first and second stabilizer assemblies are locked unless said pressure source is selectively connected to said first and second stabilizer assemblies for selective pressurization thereof.

7. The vehicle set forth in claim 1 further including a boom, and means for pivoting said boom through a predetermined vertical angle, wherein said flow controller also includes sensing means for sensing when said boom is elevated above said predetermined angle for setting said flow controller in said second mode, and wherein when (1) said flow controller is in said second mode and (2) said pressure source is selectively connected to said first and second stabilizer assemblies for selective pressurization thereof, said first and second stabilizer assemblies shift said front and rear axles.

8. The vehicle set forth in claim 1 further including a boom, and means for pivoting said boom through a predetermined vertical angle, wherein said flow controller also includes sensing means for sensing when said boom is elevated above said predetermined angle for setting said flow controller in said second mode, wherein said flow controller is also operative in a third mode wherein said first stabilizer assembly is coupled to said second stabilizer assembly when said second stabilizer assembly is pressurized by said source to shiftably move said second axle and wherein said first stabilizer assembly is locked when said second stabilizer assembly is not pressurized, wherein said vehicle also includes brake means, and means responsive to the operation of said brake means and said sensing means for setting said flow controller in said third mode, and wherein when (1) said flow controller is in said third mode, (2) said brake is activated, and (3) said boom is elevated below said predetermined angle, said first stabilizer assembly is locked and said second stabilizer assembly is free to extend and retract.

9. The vehicle set forth in claim 1 further including a boom, and means for pivoting said boom through a predetermined vertical angle, wherein said flow controller also includes sensing means for sensing when said boom is elevated above said predetermined angle for setting said flow controller in said second mode, wherein said flow controller is also operative in a third mode wherein said first stabilizer assembly is coupled to said second stabilizer assembly when said second stabilizer assembly is pressurized by said source to shiftably move said second axle and wherein said first stabilizer assembly is locked when said second stabilizer assembly is not pressurized, wherein said vehicle also includes brake means, and means responsive to the operation of said brake means and said sensing means for setting said flow controller in said third mode, and wherein when (1) said flow controller is in said third mode, (2) said brake is activated, and (3) said boom is elevated above said predetermined angle, said first and second stabilizer assemblies are locked unless said second stabilizer assembly is pressurized.

10. The vehicle set forth in claim 1 further including a boom, and means for pivoting said boom through a predetermined vertical angle, wherein said flow controller also includes sensing means for sensing when said boom is elevated above said predetermined angle for setting said flow controller in said second mode, wherein said flow controller is also operative in a third mode wherein said first stabilizer assembly is coupled to said second stabilizer assembly when said second stabilizer assembly is pressurized by said source to shiftably move said second axle and wherein said first stabilizer assembly is locked when said second stabilizer assembly is not pressurized, wherein said vehicle also includes brake means, and means responsive to the operation of said brake means and said sensing means for setting said flow controller in said third mode, and wherein when (1) said flow controller is in said third mode, (2) said brake is activated, (3) said boom is elevated above said predetermined angle, and (4) said second stabilizer assembly is pressurized, said first and second stabilizer assemblies shift in unison.

11. A method of stabilizing a vehicle having a frame, a boom pivotally mounted on said frame for movement through preselected vertical angles, a front axle mounted on said frame for shiftable movement relative thereto, a rear axle mounted on said frame for shiftable movement relative thereto, said method comprising the steps of:

controlling shifting movement of said axles by selecting between a first mode wherein when said boom is below a predetermined vertical angle, one of said axles is permitted to shift relative to said frame and the other of said axles is selectively locked relative to said frame, and a second mode wherein when said boom is above a predetermined vertical angle, both of said axles are selectively locked relative to said frame.

12. The method set forth in claim 1 wherein the shifting of said front and rear axles is at a substantially slower speed when said boom is above said predetermined angle than when said boom is below said predetermined angle.

13. The method set forth in claim 12 wherein said vehicle also includes a first stabilizer cylinder connected to said front axle for shifting the same, and a second stabilizer cylinder connected to said rear axle for shifting the same, and further including the step of coupling one of said cylinders toe a pressure source when said boom is above said predetermined vertical angle.

14. The method set forth in claim 11 and further including the steps of locking said one axle when said vehicle is at rest, and shifting both axles at a substantially slower rate when said boom is above said predetermined angle and said vehicle is at rest.

15. The method set forth in claim 14 wherein said vehicle further includes a first stabilizer cylinder connected to said front axle for shifting the same, and a second stabilizer cylinder connected to said rear axle for shifting the same, and further including the step of coupling one of said cylinders to a pressure source when said boom is above said predetermined vertical angle and said vehicle is at rest.

16. The method set forth in claim 15 and further including the step of locking both axles if said vehicle is inclined from the horizontal at a predetermined minimum angle.

17. A method of stabilizing a vehicle having a frame, a boom pivotally mounted on said frame for movement through preselected vertical angles, a front axle supported at the opposite ends thereof by wheels and connected to said frame for shiftable movement relative thereto, and a rear axle supported at the opposite ends thereof by wheels and connected to said frame for shiftable movement relative thereto, said method comprising the steps of:

controlling shifting movement of said axles by selecting between a first mode wherein when said boom is below a predetermined vertical angle, one of said axles is permitted to shift relative to said frame at a first rate and the other of said axles is selectively locked relative to said frame, and a second mode wherein when said boom is above a predetermined vertical angle, said one axle is permitted to shift relative to said frame at a second rate which is slower than the first rate and the other axle is selectively locked relative to said frame.

* * * * *